United States Patent Office 3,689,477
Patented Sept. 5, 1972

3,689,477
PRODUCTION OF N-ACYL-CAPROLACTAMS
Isamu Fujita, Ikeda, and Tooru Yoneya, Amagasaki, Japan, assignors to Kanegafuchi Boseki Kabushiki Kaisha
No Drawing. Filed Feb. 2, 1971, Ser. No. 112,028
Int. Cl. C07d 41/06
U.S. Cl. 260—239.3 A                 11 Claims

ABSTRACT OF THE DISCLOSURE

This invention relates to a process for producing N-acyl caprolactams. More particularly, the present invention relates to a process for producing N-acyl caprolactams by bringing an acyl cyclohexanone oxime, in a gaseous or vapour phase, in contact with a silica-alumina catalyst.

DETAILED DESCRIPTION OF THE INVENTION

An N-acyl caprolactam has various industrial uses. Thus for example it is useful as an initiator for the polymerization of epsilon-caprolactam. Further, by hydrolyzing an N-acyl caprolactam, there can be produced epsilon-caprolactam and aminocaproic acid. Further, an N-acyl caprolactam, upon halogenation, amination and hydrolysis, can be converted into lysine which is an essential amino acid.

However, there has been developed no industrially practical method for preparing N-acyl caprolactams.

Therefore, it is a principal object of this invention to provide a novel process for industrially producing N-acyl caprolactams.

A more particular object of this invention is to provide a process for industrially easily producing N-acyl caprolactams at a high yield and with a high purity from an acyl cyclohexanone oxime.

Other objects of this invention will be apparent from the following description.

We have now found that an N-acyl caprolactam can be obtained industrially easily at a high yield and high purity when an acyl cyclohexanone oxime is catalytically contacted, in a vapour or gaseous phase, with a silica-alumina catalyst.

Thus, according to this invention, an acyl cyclohexanone oxime represented by the general formula

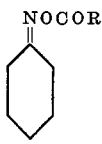

wherein R represents hydrogen or methyl or ethyl group, in vapour phase is contacted with a silica-alumina catalyst.

The acyl cyclohexanone oxime, the starting material to be used in the present invention, is represented by the above general formula, and more particularly it is formyl cyclohexanone oxime, acetyl cyclohexanone oxime or propionyl cyclohexanone oxime.

In carrying out the reaction of the present invention, a thermostatic reactor is filled with a silica-alumina catalyst, and is heated with an electric heater or the like. Then, a vapour of an acyl cyclohexanone oxime is passed through the reactor so as to be in contact with said catalyst in a vapour phase. In this case, the vapour of the acyl cyclohexanone oxime may be diluted with an inert gas such as nitrogen, carbon dioxide, hydrogen or helium.

The catalyst in the reactor may be in the form of a fixed bed or it may be in the form of a fluidized bed wherein the catalyst is used in finely powdered form.

The silica-alumina catalyst to be used in the present invention essentially comprises silica and alumina. Usually such catalyst is artificially prepared. However, if desired, a natural product such as clay mineral, e.g. acid clay or activated clay can also be used. In artificially preparing a silica-alumina catalyst, various methods may be employed. Thus, for example, silica gel and alumina gel are kneaded together in a wet state. Another method is to deposit aluminum salt on silica gel by dipping. It is also possible to prepare the catalyst by simultaneously precipitated silica and alumina from an aqueous solution containing the same. Alternatively, alumina gel may be precipitated on silica gel. In any case, it is usual that the above prepared solid material is dried and then fired or roasted for activation. The firing temperature is in a range of 300 to 1300° C., preferably 400 to 1000° C. The time for firing or roasting is in a range of 0.5 to 100 hours, preferably 1 to 50 hours. The preferable composition of the catalyst is in the range of the weight ratio of $SiO_2:Al_2O_3$ of 10:90 to 99:1, preferably 60:40 to 95:5.

The reaction temperature at which an acyl hexanone oxime is contacted with the catalyst may vary depending on the composition of the silica-alumina catalyst and also on the particular conditions under which the catalyst has been prepared but is usually in the range of 100 to 350° C., preferably 120 to 270° C., more preferably 130 to 230° C.

The reaction pressure may be in a range of 0.1 to 1000 mm. Hg, preferably 1 to 800 mm. Hg.

The rate of feed of the acyl cyclohexanone oxime may be in a range of 0.1 to 10 kg., particularly 0.5 to 5 kg. per hour per 1 kg. of the catalyst.

The reaction product obtained under such reaction conditions contains the corresponding N-acyl caprolactam, unreacted acyl cyclohexanone oxime, epsilon-caprolactam as a by-product and a slight amount of unidentified substances.

The reaction product mixture can be separated into respective components by distillation or any other suitable method. However, according to the method of this invention, it is easy to make the rate of conversion of the acyl cyclohexanone oxime almost 100% so that, in such case, unreacted acyl cyclohexanone oxime is substantially absent in the reaction product. In this case the separating or purification step can be simplified.

The factors influencing the yield of the N-acyl caprolactam are the composition of the catalyst, the conditions for preparing such catalyst and the conditions under which gaseous oxime is contacted with the catalyst. However, we have found that the reaction temperature among them is the most important factor. Thus when the reaction is conducted within a proper temperature range, an N-acyl caprolactam is selectively obtained and epsilon-caprolactam is produced only slightly. However, if the reaction temperature is elevated, the yield of the N-acyl caprolactam gradually reduces while the yield of epsilon-caprolactam increases. When the reaction temperature is further elevated to be above 350° C., the yield of epsilon-caprolactam reduces and even the total yield of the N-acyl caprolactam and epsilon-caprolactam also quickly reduces.

If the finally desired product is epsilon-caprolactam, the production of epsilon-caprolactam in the process of this invention is not unfavorable, because the reaction product mixture of N-acyl caprolactam and epsilon-caprolactam may be hydrolyzed so that the N-acyl caprolactam will be easily converted into epsilon-caprolactam. Further, the carboxylic acid formed in the course of the hydrolysis may be recovered and can be reused as an acylating agent for the production of acyl cyclohexanone oximes.

The important feature of the present invention is in that an N-acyl caprolactam can be obtained at a high yield by a novel process by using an acyl cyclohexanone oxime as the starting material. It should be noted that an N-acyl caprolactam has never been obtained by ordinary Beckmann's rearrangement reaction but has become possible according to the invention by carrying out a gas phase catalytic reaction by using silica-alumina as a catalyst and acyl hexanone oximes as the starting material.

Such peculiar catalytic action of silica-alumina has been unknown prior to this invention. In this respect, the present invention is an unexpected one quite different from the conventional technique.

As described above, according to the present invention, an N-acyl caprolactam can be industrially easily and smoothly produced at a high yield and high purity by contacting the above mentioned particular acyl cyclohexanone oxime, in vapour phase, with a silica-alumina catalyst, and its industrial value is high.

The present invention will be illustrated in the following examples in which the rate of conversion of acyl cyclohexanone oxime and the yields of N-acyl caprolactam and epsilon-caprolactam were determined by the following formulas:

Rate of conversion (percent) of acyl cyclohexanone oxime $$= \frac{\text{Amount of converted acyl cyclohexanone oxime (mols)}}{\text{Amount of used acyl cyclohexanone oxime (mols)}} \times 100$$

Yield (percent) of N-acyl caprolactam $$= \frac{\text{Amount of produced N-acyl caprolactam (mols)}}{\text{Amount of used acyl cyclohexanone oxime (mols)}} \times 100$$

Yield (percent) of epsilon-caprolactam $$= \frac{\text{Amount of produced epsilon-caprolactam (mols)}}{\text{Amount of used acyl cyclohexanone oxime (mols)}} \times 100$$

Example 1

A commercial silica-alumina catalyst [N-631(L) ($SiO_2:Al_2O_3=87:13$) produced by Nikki Chemical Co., Ltd.] was heat-treated at 500° C. for 2.5 hours and crushed to 14 to 35 meshes. Ten grams of thus prepared catalyst were filled in a vertical reaction tube having an inside diameter of 15 mm. and length of 300 mm. made of quartz. The temperature of the catalyst layer was maintained to be 150° C. by heating the outside of this reaction tube with an electric heater. The reaction tube was provided at its lower end a reaction product receiver cooled with a Dry Ice-methanol coolant. This receiver was connected to a vacuum pump through a trap to keep the pressure within the reaction tube at 5 mm. Hg. Acetyl cyclohexanone oxime was vaporized and 15.6 g. of the same were gradually fed into the reaction tube over 2 hours so as to contact with the catalyst layer, to obtain 15.3 g. of a reaction product. When a part of this reaction product was quantitatively analyzed with a gas chromatograph (polyethylene glycol column, 200° C.), it was observed that the content of N-acetyl caprolactam was 14.5 g. and that of epsilon-caprolactam was 0.5 g. Thus, the yield of N-acetyl caprolactam was 93% and the yield of epsilon-caprolactam was 4%. By the way, the N-acetyl caprolactam and epsilon-caprolactam were respectively identified by the fact that the respective compounds isolated and purified from the reaction product coincided in infrared spectra with the samples of the same compounds already existing and prepared in known manners. Thus, when 10 g. of the reaction product were rectified, there were obtained 8.2 g. of a fraction at 96–99° C./5 mm. Hg and 0.2 g. of a fraction at 120–122° C./5 mm. Hg. The infrared absorption spectrum of the first fraction showed absorptions of the same wave lengths (3.44, 5.88, 5.98, 7.30, 7.95, 8.43 and 10.34 m$\mu$) as of the infrared obsorption spectrum of the N-acetyl caprolactam synthesized from epsilon-caprolactam and acetic anhydride. The infrared absorption spectrum of the second fraction showed the same absorptions (3.1, 3.2, 3.35, 6.05, 7.35, 8.35, 8.9, 10.2, 12.15 and 12.4 m$\mu$) as of epsilon-caprolactam. When the latter fraction was blended with the existing epsilon-caprolactam, no melting point drop was observed (melting point was 69.2° C.).

Example 2

The same procedure as in Example 1 was repeated exactly but the reaction temperature was varied as in Table 1. The results are shown in Table 1.

TABLE 1

| Reaction temperature (° C.) | Rate of conversion (percent) of acetyl cyclohexanone oxime | Yield of N-acetyl caprolactam (percent) | Yield of epsilon-caprolactam (percent) |
| --- | --- | --- | --- |
| 120 | 83 | 81 | 0.6 |
| 150 | 100 | 93 | 4 |
| 200 | 100 | 85 | 6 |
| 240 | 100 | 70 | 17 |
| 270 | 100 | 52 | 33 |
| 300 | 100 | 29 | 40 |
| 330 | 100 | 12 | 50 |
| 350 | 100 | 3 | 38 |

From the above results, it is evident that, when the reaction temperature is lower than 240° C., N-acetyl caprolactam is obtained at a high yield. When the reaction temperature is further elevated, the yield of N-acetyl caprolactam reduces but epsilon-caprolactam tends to increase. In any event, a temperature above 350° C. should be avoided.

Example 3

The same procedure as in Example 1 was repeated except that 7.5 g. of the silica-alumina catalyst was used, reaction temperature was 190° C., the reaction pressure was 100 mm. Hg, the rate of flow of nitrogen was 12 liters (NTP)/hr. and a vapor of acetyl cyclohexanone oxime was passed in contact with the catalyst at a rate of 6 g./hr. for 3 hours. There were obtained 17.6 g. of a reaction product. The yield of N-acetylcaprolactam as determined by the analysis conducted in the same manner as in Example 1 was 15.0 g. (83%). The yield of epsilon-caprolactam was 14 g. (11%).

The same procedure was repeated except that each of formyl cyclohexanone oxime and propionyl cyclohexanone oxime was used in place of acetyl cyclohexanone oxime. When formyl cyclohexanone oxime was used, the yield of N-formyl caprolactam was 63% and that of epsilon-caprolactam was 25%. In the case that priopinyl cyclohexanone oxime was used, the yield of N-propionyl caprolactam was 81% and that of epsilon-caprolactam was 11%.

Example 4

The same procedure as in Example 1 was carried out except as catalyst, there were used 10 g. of activated clay (prepared by heating the product of Mizusawa Chemical Industrial Co., Ltd. of 8 to 15 meshes at 600° C. for 3 hours), the reaction temperature was 220° C., the reaction pressure was 10 mm. Hg and 10 g. of acetyl cyclohexanone oxime in gaseous phase were kept in contact with the catalyst for 2 hours. There were obtained 9.5 g. of a reaction product. The yield of N-acetyl caprolactam as determined by the analysis as in Example 1 was 6.8 g. (68%) while the yield of epsilon-caprolactam was 0.9 g. (13%).

The same procedure was repeated except that each of formyl cyclohexanone oxime and propionyl cyclohexanone oxime was used in place of acetyl cyclohexanone oxime. When formyl cyclohexanone oxime was used, the yield of N-formyl caprolactam was 60% and that of epsilon-caprolactam was 11%. In the case that propionyl cyclohexanone oxime was used, the yield of N-propionyl caprolactam was 73% and that of epsilon-caprolactam was 5%.

Example 5

The procedure was conducted in the same manner as in Example 1 except that each of formyl cyclohexanone oxime and propionyl cyclohexanone oxime was used in place of the acetyl cyclohexanone oxime, 10 g. of a silica-alumina catalyst [N-631(H) ($SiO_2$:$Al_2O_3$=74:26) product of Nikki Chemical Co., Ltd., heat-treated at 450° C. for 3 hours, particle size 14 to 35 meshes] were used, the reaction temperature was 180° C. and 4 g. of the gas of each of the above mentioned acyl oximes were passed in contact with the catalyst for 1 hour. The results are shown in Table 2.

TABLE 2

| Oxime used | Yield (percent) of N-acyl-caprolactam | Yield (percent) of epsilon-caprolactam |
|---|---|---|
| Formyl cyclohexanone oxime | 32 | 51 |
| Propionyl cyclohexanone oxime | 75 | 11 |

Example 6

(A) Preparation of catalyst.—80 cc. of concentrated sulfuric acid and water were added to 537 cc. of a 22% aqueous solution of aluminum sulfate to make the total amount 5.5 liters. Separately, water was added to 1040 cc. of water glass (specific gravity 1.40) to prepare 25.5 liters of an aqueous solution. These both solutions were mixed together while stirring. After mixing the pH of the liquid became about 7 and then there occurred gelling in several minutes. The gel was left for 3 days and washed with water for one day. Then there were added 15 liters of a 1% aqueous solution of aluminum sulfate, and the mixture was heated to 70° C. for 3 hours, and then decanted to remove water. This operation was repeated 7 times and further the same operation was carried out four times with the use of distilled water. Then the solid product was recovered by filtration, and dried at 150° C. for 10 hours to obtain 450 g. of a solid. The solid was shaped into 8–14 mesh particles, which were then heat-treated at 500° C. for 2 hours. Upon analysis the composition of this catalyst was $SiO_2$:$Al_2O_3$=82:18.

(B) Production of N-acetyl caprolactam.—5 g. of the above prepared silica-aluminum catalyst (8 to 14 meshes) were filled into a U-shaped reaction tube (inside diameter 25 mm., length 600 mm.) made of stainless steel. The reaction tube was heated on a molten salt bath. At the outlet of the reaction tube, there was provided a reaction product receiver cooled with a Dry Ice-methanol coolant. This receiver was connected to a vacuum pump through a trap so that the pressure within the reaction tube is kept at 50 mm. Hg.

20 g./hr. of acetyl cyclohexanone oxime were fed from the side opposite to the catalyst filled part of the U-shaped reaction tube at a rate of 20 g./hr. and also nitrogen was fed at a rate of 2.9 liters/hr. (N.T.P.) so that the acetyl cyclohexanone oxime was completely vaporized before it reached the catalyst filled part. The vapor was contacted with the catalyst layer at a temperature of 230° C. Upon analysis of the reaction product in the same method as in Example 1, the rate of conversion of acetyl cyclohexanone oxime was 100%, the yield of N-acetyl caprolactam was 95% and the yield of epsilon-caprolactam was 3%.

Example 7

The same procedure as in Example 6 was repeated except that the reaction temperature was varied as in Table 3. The results are shown in Table 3.

TABLE 3

| Reaction temperature (° C.) | Conversion (percent) of acetyl cyclohexanone oxime | Yield (percent) of N-acetyl caprolactam | Yield (percent) of epsilon-caprolactam |
|---|---|---|---|
| 120 | 47 | 45 | 0.2 |
| 150 | 83 | 80 | 1 |
| 200 | 99 | 93 | 1.5 |
| 230 | 100 | 95 | 3 |
| 250 | 100 | 91 | 6 |
| 270 | 100 | 89 | 8 |
| 300 | 100 | 79 | 11 |
| 320 | 100 | 70 | 17 |
| 350 | 100 | 59 | 15 |

As evident from the table, even at the reaction temperature of 120° C., the reaction proceeds considerably and gives substantially only N-acetyl caprolactam as a product. At about 200° C., the rate of conversion of acetyl cyclohexanone oxime becomes 100% and, at 200 to 270° C., N-acetyl caprolactam is obtained at a high yield. If the temperature is elevated to be higher than this, yield of N-acetyl caprolactam decreases and yield of epsilon caprolactam increases. However, at 350° C., the yield decreases again. Therefore, a temperature above 350° C. should be avoided.

Example 8

The same procedure as in Example 6 was repeated except that the rate of feed of acetyl cyclohexanone oxime was varied. The results are shown in Table 4.

TABLE 4

Rate of feed of acetyl cyclohexane oxime

| Feeding rate (g./hr.) | Amount per unit catalyst (kg./hr./kg. catalyst) | Yield (percent) of N-acetyl caprolactam | Yield (percent) of epsilon-caprolactam |
|---|---|---|---|
| 0.5 | 0.1 | 88 | 8 |
| 2.5 | 0.5 | 93 | 5 |
| 5 | 1 | 94 | 4 |
| 10 | 2 | 93 | 6 |
| 20 | 4 | 95 | 3 |
| 25 | 5 | 94 | 5 |
| 30 | 6 | 92 | 2 |
| 50 | 10 | 83 | 4 |

As mentioned above, the rate of feed of acetyl cyclohexanone oxime can be varied over such a wide range as 0.1 to 10 kg. per kg. of the catalyst per hour, but particularly a range of 0.5 to 5 kg. is more preferable.

Example 9

Catalysts having such compositions as are shown in Table 4 were prepared in the same manner as in Example 6 and their reactivities were investigated.

The same apparatus as in Example 6 was used. In each case, the amount of the catalyst was 5 g. The reaction pressure was 60 mm. Hg. The reaction temperature was 250° C. The rate of feed of acetyl cyclohexanone oxime was 15 g./hr. The rate of feed of hydrogen gas was 3.2 liters/hr. The results of the analyses of the products after the reactions for 2 hours are shown in Table 5.

TABLE 5

| Catalyst composition $SiO_2$:$Al_2O_3$ | Conversion (percent) of acetyl cyclohexanone oxime | Yield (percent) of N-acetyl caprolactam | Yield (percent) of epsilon-caprolactam |
|---|---|---|---|
| 10:90 | 69 | 53 | 10 |
| 30:70 | 78 | 75 | 2 |
| 60:40 | 99 | 94 | 3 |
| 82:18 | 100 | 93 | 5 |
| 95:5 | 100 | 91 | 5 |
| 99:1 | 71 | 65 | 4 |

As evident from Table 5, the catalyst has an activity over a wide range of compositions. However, an especially high activity can be obtained in a range SiO$_2$:Al$_2$O$_3$ of 60:40 to 95:5.

Example 10

A fluidized bed reaction was carried out by using the same catalyst (particle size 60 to 150 meshes) as in Example 1.

A glass-made U-shaped reaction tube having an inside diameter of 19 mm. and length of 300 mm. was packed with glass wool. Above the glass wool there were placed porcelain pieces (14 to 28 meshes). On the layer of the porcelain particles there were charged with 3 g. of the catalyst. The flow of the reaction gas was directed upwardly so that the catalyst is fluidized. The reaction tube was heated on a molten salt bath. The reaction temperature was maintained at 270° C. Further, the reaction pressure was made 20 mm. Hg.

Acetyl cyclohexanone oxime was fed at a rate of 13 g./hr. After the reaction for 2 hours, the reaction product was analyzed. The conversion of acetyl cyclohexanone oxime was 99%, the yield of N-acetyl caprolactam was 85% and that of epsilon-caprolactam was 11%.

Example 11

The reaction was carried out in the same manner as in Example 1 except that 10 g. of a silica-alumina catalyst [N–631(L) (SiO$_2$:Al$_2$O$_3$=87:13) product of Nikki Chemical Co., Ltd., was roasted at 650° C. for 3 hours, particle size 14 to 35 meshes] were used, the reaction temperature was 145° C. or 370° C. and the reaction pressure was 3 mm. Hg and acetyl cyclohexanone oxime was passed in contact with the catalyst layer at a rate of 5 g./hr. for 2 hours. The results are shown in Table 6.

Further, for comparison, the same procedure was repeated except that cyclohexanone oxime was used in place of the above mentioned acetyl hexanone oxime and the reaction temperature was 145 or 370° C. The results are also indicated in Table 6.

TABLE 6

| Oxime used | Reaction temperature (° C.) | Yield (percent) of epsilon-caprolactam | Yield (percent) of N-acetyl-caprolactam |
|---|---|---|---|
| Acetyl cyclohexanone oxime | 145 | 2 | 95 |
|  | 170 | 3 | 96 |
|  | 370 | 9 | 0.6 |
| Cyclohexanone oxime | 145 | 0 | 0 |
|  | 170 | 40 | 0 |
|  | 370 | 72 | 0 |

From the above mentioned results, in comparing the reactivities at the reaction temperature of 145° C., it is found that, in the case of acetyl cyclohexanone oxime, the yield of N-acetyl caprolactam was as high as 95% and that of epsilon-caprolactam was only 2% but, in the case of cyclohexanone oxime, no epsilon-caprolactam was produced. Further, in case the reaction temperature was 170° C., with acetyl cyclohexanone oxime, the results of 96% N-acetyl caprolactam and 3% epsilon-caprolactam were obtained but, with cyclohexanone oxime, only 40% epsilon-caprolactam was obtained. Further, at the reaction temperature of 370° C., with acetyl cyclohexanone oxime, substantially no N-acetyl caprolactam was produced, only a little epsilon-caprolactam was obtained. However, with cyclohexanone oxime, the reaction product was thick brown and was very impure but the maximum value of the rate of yield of epsilon-caprolactam of 72% was obtained.

What we claim is:

1. A process for producing N-acyl caprolactams characterized by bringing an acyl cyclohexanone oxime represented by the formula:

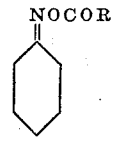

wherein R represents hydrogen or a methyl or ethyl group, in vapour phase, in contact with a silica-alumina catalyst.

2. A process according to claim 1 wherein the contact is conducted at a temperature of 100–350° C.

3. A process according to claim 1 wherein the contact is conducted at a temperature of 120–270° C.

4. A process according to claim 1 wherein the contact is conducted at a pressure of 0.1–1000 mm. Hg.

5. A process according to claim 1 wherein the contact is conducted at a pressure of 1–800 mm. Hg.

6. A process according to claim 1 wherein the catalyst is in the form of a fixed bed.

7. A process according to claim 1 wherein the catalyst is in the form of a fluidized bed.

8. A process according to claim 1 wherein the SiO$_2$:Al$_2$O$_3$ composition of the catalyst is 10:90 to 99:1 based on weight.

9. A process according to claim 1 wherein the rate of feed of the oxime is 0.1–10 kg. per hour per kg. of the catalyst.

10. A process according to claim 1 wherein the rate of feed of the oxime is 0.5–5 kg. per hour per kg. of the catalyst.

11. The process according to claim 1 wherein the SiO$_2$:Al$_2$O$_3$ composition of the catalyst 10:90 to 99:1 based on weight and the contact is conducted at a temperature of 100–350° C. and at a pressure of 0.1–1000 mm. Hg.

References Cited

FOREIGN PATENTS 1,265,437  5/1961  France _____ 260—239.3 A

OTHER REFERENCES

Organic Reactions, vol. 11, pp. 45–46 (Wiley) (1960), edited by Adams et al.

HENRY R. JILES, Primary Examiner

R. T. BOND, Assistant Examiner

U.S. Cl. X.R.

260—239.3 R